(12) United States Patent
Dulac

(10) Patent No.: US 7,750,623 B2
(45) Date of Patent: *Jul. 6, 2010

(54) METHOD AND DEVICE FOR LOCATING THE RIGHT OR LEFT POSITION OF A WHEEL OF A VEHICLE

(75) Inventor: Gilles Dulac, Villeneuve Tolosane (FR)

(73) Assignee: Continental Automotive France, Toulouse (FR)

( * ) Notice: Subject to any disclaimer, the term of this patent is extended or adjusted under 35 U.S.C. 154(b) by 188 days.

This patent is subject to a terminal disclaimer.

(21) Appl. No.: 11/995,932

(22) PCT Filed: Jun. 23, 2006

(86) PCT No.: PCT/EP2006/006053

§ 371 (c)(1),
(2), (4) Date: Jan. 17, 2008

(87) PCT Pub. No.: WO2007/009551

PCT Pub. Date: Jan. 25, 2007

(65) Prior Publication Data

US 2008/0197837 A1    Aug. 21, 2008

(30) Foreign Application Priority Data

Jul. 18, 2005    (FR) .................................. 05 07588

(51) Int. Cl.
*G01B 7/30* (2006.01)
*G01P 3/48* (2006.01)

(52) U.S. Cl. ............................ 324/207.15; 324/207.22; 324/207.25; 324/165; 324/173

(58) Field of Classification Search ............ 324/207.25, 324/207.15, 207.22, 165, 173; 340/445
See application file for complete search history.

(56) References Cited

U.S. PATENT DOCUMENTS

| 4,210,859 A | 7/1980 | Meretsky et al. |
| 6,917,287 B2 | 7/2005 | Boulot |
| 2006/0044125 A1 | 3/2006 | Pierbon |

FOREIGN PATENT DOCUMENTS

| DE | 44 08 511 A1 | 9/1995 |
| EP | 1 315 178 A1 | 5/2003 |
| EP | 1 481 823 A1 | 12/2004 |
| FR | 2 816 775 A | 5/2002 |
| WO | 01/41319 A1 | 6/2001 |
| WO | 2004/048131 A1 | 6/2004 |

*Primary Examiner*—Reena Aurora
(74) *Attorney, Agent, or Firm*—Young & Thompson

(57) ABSTRACT

Method and device for locating the right or left position of a wheel of a vehicle. The wheel has a magnetic measuring component including a core of ferromagnetic material on which are arranged, crosswise, two windings presenting maximum sensitivity axes extending in a plane intersecting the rotational axis of the wheel, and offset from each other, in this intersecting plane, by an angle $\theta$, and on movements of the vehicle, a measurement is taken of a signal generated by the variation of a magnetic field at the terminals of each of the windings so as to deliver two periodic signals phase-shifted from each other by (+ or −) $\theta$, the direction of rotation of the wheel is determined from this phase difference and, from this direction of rotation and from the direction of movement of the vehicle, the location of the right or left position of the wheel is deduced.

7 Claims, 2 Drawing Sheets

Figure 1:
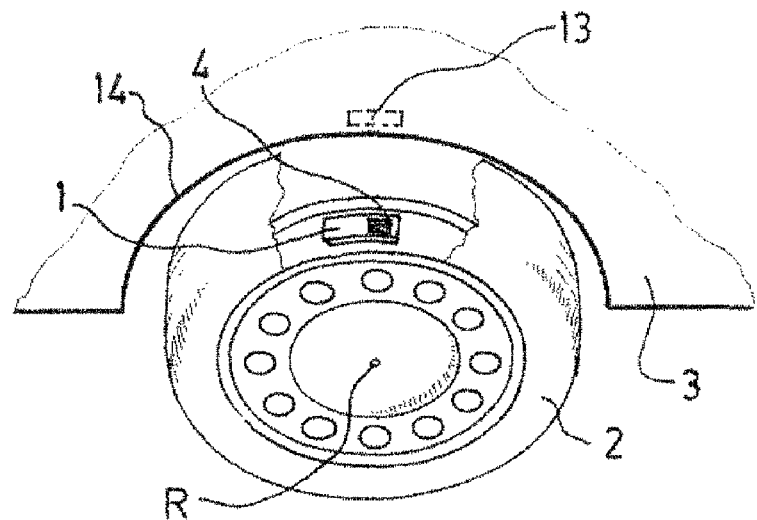

METHOD AND DEVICE FOR LOCATING THE RIGHT OR LEFT POSITION OF A WHEEL OF A VEHICLE

The invention relates to a method and a device for locating the right or left position of a wheel of a vehicle. It extends to a magnetic measuring component suitable for incorporation in an electronic monitoring system unit of a vehicle.

Increasingly, motor vehicles have, for safety purposes, monitoring systems comprising sensors fitted on each of the wheels of the vehicle, dedicated to measuring parameters, such as the pressure or temperature of the tyres fitted on these wheels, and intended to inform the driver of any abnormal variation of the measured parameter.

These monitoring systems are conventionally provided with an electronic unit fitted on each wheel of the vehicle and incorporating a sensor comprising a microprocessor and a radiofrequency transmitter (or RF transmitter), and a central unit for receiving the signals transmitted by the transmitters, comprising a computer incorporating a radiofrequency receiver (or RF receiver) connected to an antenna.

One of the problems that monitoring systems have to resolve lies in the need to have associated with each signal received by the receiver of the central unit, information concerning the location of the sensor and therefore the wheel originating this signal, this obligation remaining throughout the life of the vehicle, that is, having to be respected even after wheel changes or more simply reversals of the positions of these wheels.

At the present time, a first locating method consists in using three low-frequency antennas, each positioned near to one of the wheels of the vehicle, and performing a locating procedure that consists in successively exciting each of these three antennas by the transmission of a low-frequency magnetic field.

According to this procedure, the sensor fitted on the wheel located close to the excited antenna orders, in response and to the central unit, the transmission of a low-frequency signal including an identification code of said sensor, so that the successive excitation of the three antennas results in the locating of the three sensors fitted on the wheels adjacent to these antennas, and by deduction, the location of the fourth sensor.

The main advantage of such a method lies in the fact that the locating procedure is very rapid and results in an almost instantaneous locating after the vehicle has started up.

However, this solution entails fitting the vehicle with three antennas with all the attendant constraints: connecting cables, control amplifiers, and so on, such that it is costly.

In order to limit the cost required by the locating procedure, a second solution currently implemented consists, firstly, in reducing the number of antennas to two, and in positioning these two antennas close to the two front wheels, so as to enable said two front wheels to be located, and to differentiate the latter from the two rear wheels.

This second solution further combines, with the use of the two antennas, a technique based on a statistical method consisting in comparing the accelerations of the wheels when turning, to provide a discrimination between the left wheels and the right wheels.

Because an antenna has been eliminated, this second solution is, as mentioned above, less costly than that described previously. However, this saving is obtained at the cost of the speed of the locating procedure which, according to this second solution, is relatively lengthy because of the fact that a consequential running time is required to obtain the left/right discrimination.

The present invention aims to overcome the drawback associated with the length of the left/right locating procedure of the second technique described above, and its main objective is to provide a left/right locating method that is very efficient in terms of responsiveness, also requiring, for its implementation, a component with an overall price and installation cost less than the overall price of an antenna. This component also needs to be small.

To this end, the first aim of the invention is a method of locating the left or right position of a wheel of a vehicle equipped with an electronic monitoring system unit, in which:

a magnetic measuring component is incorporated in the electronic unit, comprising a core made of ferromagnetic material on which are wound crosswise two windings configured to present maximum sensitivity axes offset from each other by a predetermined angle $\theta$, and to position said magnetic measuring component in said electronic unit so that the maximum sensitivity axes of the windings extend in a plane intersecting the axis of rotation of the wheel, and, when the vehicle moves in a given direction of movement:

a signal generated by the variation of a magnetic field at the terminals of each of the windings is measured, so as to deliver two periodic signals phase-shifted from each other by an angular value equal to (+ or −) $\theta$, each representative of the variations of the values of the magnetic field detected by said windings during a wheel rotation, from this phase shift, the direction of rotation of the wheel is determined, and, from this direction of rotation and from the direction of movement of the vehicle, the location of the right or left position of the wheel is deduced.

The principle on which the invention is based was therefore to equip each wheel to be located of a vehicle with a coil with two windings (each winding being used as magnetic sensors), positioned in such a way that the signals at the terminals of said windings are phase-shifted relative to each other, and to deduce from this phase shift the direction of rotation and the right/left location of the wheel.

According to this principle, the invention results in a very rapid locating of the right/left position of a wheel, obtained, in practice, after a few wheel rotations.

Furthermore, according to the invention, the two windings (forming the magnetic sensors) are combined in one and the same component comprising a single core around which the two windings are placed, and whose small dimensions make it possible to incorporate it directly in a conventional electronic unit.

Because of this, the invention provides a solution with an overall price (cost and installation) that is significantly less than that of the solutions requiring antennas. Furthermore, by combining two windings around one and the same ferrite core, a component is produced that presents two functions (magnetic sensors on two distinct axes) and with a minimal footprint. The space available for this type of component is in fact taken into account.

In order to obtain two signals that can easily be discriminated, and according to an advantageous embodiment of the invention, the magnetic measuring component is positioned in the magnetic unit so that the maximum sensitivity axes of the windings extend in a plane orthogonal to the axis of rotation of the wheel.

For the same purpose, and advantageously according to the invention, a magnetic measuring component is used that is provided with a core having two pairs of parallel faces around each of which is placed a winding, configured so that said pairs of parallel faces are orthogonal to each other.

In order to increase the sensitivity and therefore the reliability of the method according to the invention, the vehicle is, moreover, advantageously equipped with a magnet that is fixed relative to each wheel equipped with a magnetic measuring component, said magnet being positioned and presenting a power suitable for generating a magnetic field covering a zone passed through by the windings when said wheel rotates.

The invention extends to a device for locating the right or left position of a vehicle wheel equipped with an electronic monitoring system unit. According to the invention, this locating device comprises, incorporated in each electronic unit:

- a magnetic measuring component comprising a core made of ferromagnetic material on which are wound, crosswise, two windings formed so as to present maximum sensitivity axes offset from each other by a predetermined angle θ, said magnetic measuring component being positioned in said electronic unit so that the maximum sensitivity axis of each winding extends in a plane intersecting the axis of rotation of the wheel,
- means of measuring a signal at the terminals of each of the windings, able to deliver two periodic signals phase-shifted from each other by an angular value equal to (+ or −) θ, each representative of the variations of the values of the magnetic field detected by said windings during a wheel rotation,
- and a computation unit programmed to determine, from the phase shift between the two periodic signals, the direction of rotation of the wheel, and to deduce, from this direction of rotation and from the direction of movement of the vehicle, the location of the right or left position of the wheel.

Advantageously according to the invention, the magnetic measuring component is positioned in the magnetic unit so that the maximum sensitivity axes of the windings extend in a plane orthogonal to the axis of rotation of the wheel.

Furthermore, this magnetic measuring component is advantageously provided with a core having two pairs of parallel faces around each of which is wound a winding, configured so that said pairs of parallel faces are orthogonal to each other.

The locating device according to the invention also, advantageously, comprises a magnet mounted in a fixed manner on the vehicle relative to each wheel equipped with a magnetic measuring component, said magnet being positioned and presenting a power suitable for generating a magnetic field covering a zone passed through by the windings when said wheel rotates.

The invention also covers, as an element essential to implementing the locating method according to said invention, a magnetic measuring component suitable for incorporation in an electronic monitoring system unit of a vehicle, comprising a core made of ferromagnetic material on which are wound crosswise two windings formed so as to present maximum sensitivity axes offset relative to each other by a predetermined angle θ.

Furthermore, the core of this magnetic measuring component advantageously has two pairs of parallel faces around each of which is positioned a winding, configured so that said pairs of parallel faces are orthogonal to each other.

Advantageously, this magnetic measuring component is thus, for example, provided with a rectangular, parallelepipedal core.

Figure 2:
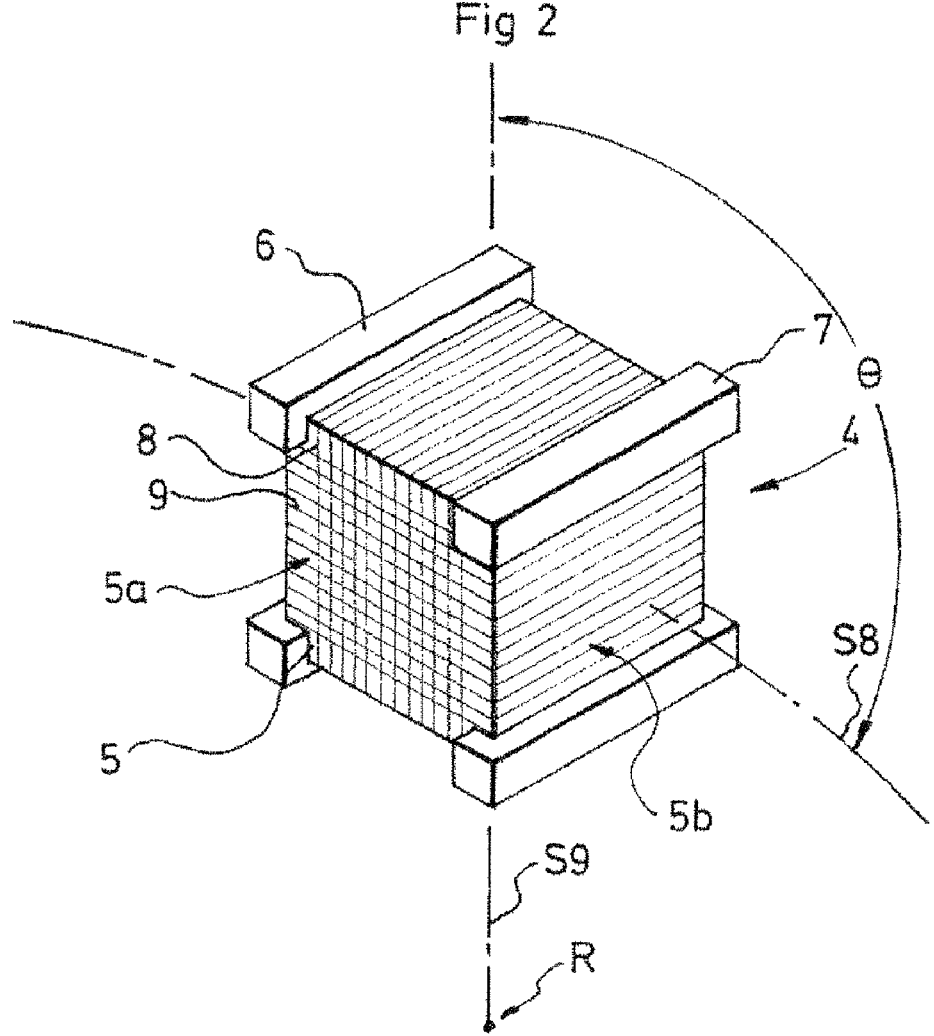
Figure 3:
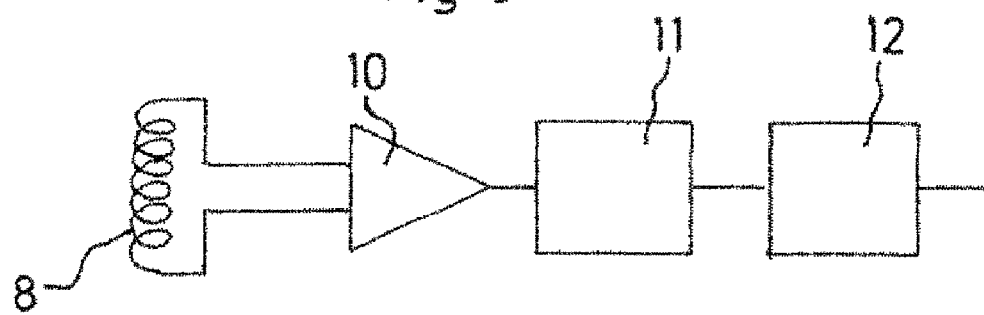
Figure 4A:
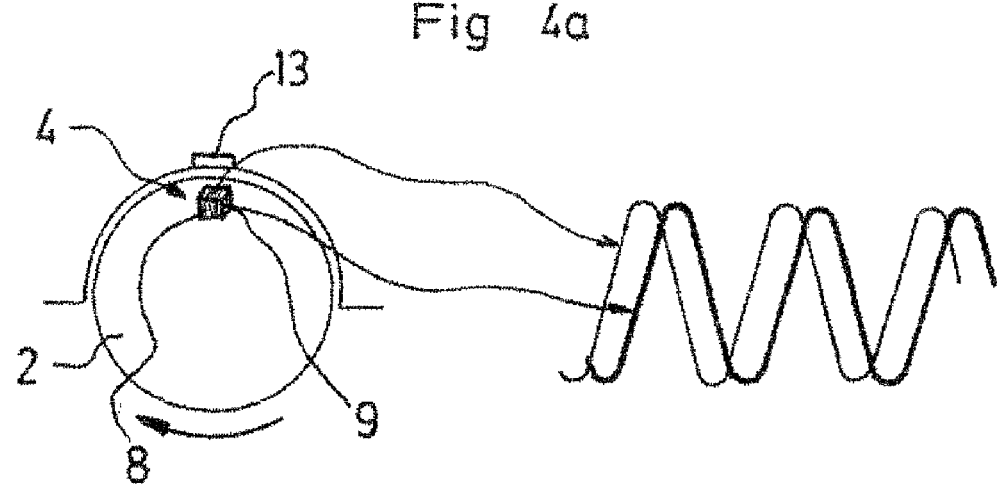
Figure 4B:
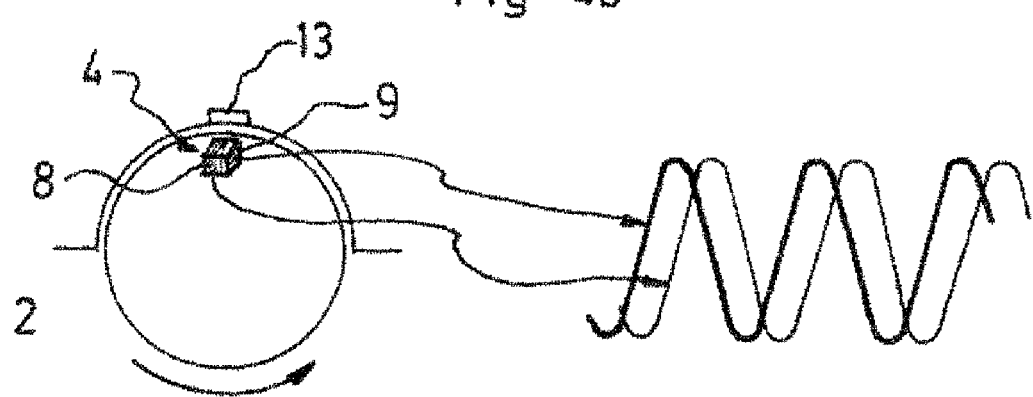

Other characteristics, aims and advantages of the invention will become apparent from the detailed description that follows, given with reference to the appended drawings, which represent, by way of nonlimiting example, a preferred embodiment. In these drawings:

FIG. 1 is a partial and diagrammatic perspective view of a vehicle equipped with a locating device according to the invention, FIG. 2 is a diagrammatic perspective view of a magnetic measuring component of a locating device according to the invention, FIG. 3 is a functional block diagram of the processing electronics of this locating device, and FIGS. 4a and 4b are two diagrams illustrating the principle of the locating method implemented according to the invention.

The locating device according to the invention represented by way of example in FIG. 1 is intended to locate the right or left position of a wheel of a vehicle.

This locating device is more specifically intended to be installed on vehicles provided with a monitoring system comprising electronic units 1 mounted on each of the wheels 2 of vehicles 3, incorporating sensors dedicated to measuring parameters, such as pressure and/or temperature of the tires fitted on these wheels 2, and intended to inform the driver of any abnormal variation of the measured parameter.

This locating device firstly comprises a magnetic measuring component 4 suitable for incorporation in an electronic unit 1, comprising two windings 8, 9 arranged so that their respective maximum sensitivity axes S8, S9 extend in a plane perpendicular to the axis of rotation (R) of the wheel 2, and are offset from each other by a predetermined angle θ=90°.

To this end, and as represented in FIG. 2, this magnetic measuring component 4 comprises a cube-shaped ferrite core 5 provided, on each of the four parallel edges, with strips such as 6, 7 projecting relative to said edges so as to extend edgewise and projecting from four faces of said cubic core: a first pair of two opposing parallel faces such as 5a, and a second pair of two opposing parallel faces such as 5b.

Furthermore, the first winding 8 is formed around the first pair of parallel faces 5a, whereas the second winding 9 is formed around the second pair of parallel faces 5b.

Arranged in this way, when the wheel 2 rotates, each of these windings 8, 9 presents, between its two terminals, a potential difference that varies according to a sinusoidal function of a period equal to the period of rotation of said wheel.

It should be noted that, in the example represented, the two windings 8, 9 are independent of each other. As a variant, these windings could be dependent. It is sufficient in practice to be able to measure a variable potential difference at the terminals of each of them.

A winding 8, 9 mounted on a wheel 2 of a vehicle 3 detects, in practice, the overall magnetic field prevailing around this winding, consisting of the Earth's magnetic field added to the environmental magnetic field that can in particular result from the presence of electrical or magnetic equipment on board the vehicle or present outside the vehicle (high-voltage line, for example).

Now, when the wheel 2 rotates, each winding 8, 9 is moved along a circular path, such that this winding 8, 9 detects a variable magnetic field and that the potential difference measured at the terminals of the winding presents corresponding cyclical variations.

Furthermore, since the two windings 8, 9 are positioned, according to the invention, so that their maximum sensitivity axes S8, S9 are orthogonal, the signals representative of the potential difference at the terminals of said windings are phase-shifted relative to each other by an angle equal to (+ or −) 90°, such that, as represented in FIGS. 4a and 4b, the analysis of this phase shift makes it possible to determine the direction of rotation of the wheel 2.

In order to measure and process the potential difference at the terminals of each winding 8, 9, the device according to the invention firstly comprises an amplification module 10 and a shaping module 11 incorporating a comparator, such that, when the wheel 2 rotates:

the signal at the terminals of each winding 8, 9 is a very low amplitude sinusoidal signal, the signal at the output of the amplification module 10 is a sinusoidal signal of the same period as the preceding signal but with an amplitude greater than that of said signal, and the signal at the output of the shaping module 11 is a square signal of the same period as the sinusoidal signals.

The device according to the invention further comprises a computation unit 12 to which the shaped signal is delivered, programmed to:

determine, as mentioned above, from the analysis of the phase shift between the two sinusoidal signals, the direction of rotation of the wheel 2, and deduce from this direction of rotation and from the direction of movement of the vehicle 3, determined elsewhere by any method known per se, the right or left position of the wheel 2.

Lastly, and according to the invention, the vehicle 3 can also comprise, as represented in FIG. 1, permanent magnets or electromagnets 13 fixed on the bodywork level with the wheel arches 14, such that the magnetic field created by each of these magnets 13 is detected by the windings 8, 9 mounted on the corresponding wheel 2, increasing the overall magnetic field detected by the windings, and consequently the amplitude of the sinusoidal signals at the output of the amplification module 10.

The device according to the invention described above therefore makes it possible, by incorporating a simple magnetic measuring component 4 of small dimensions and with a low purchase cost and which is easy to install in each electronic unit 1 fitted on a wheel 2 of a vehicle 3, to very rapidly locate, after a few rotations of the wheel 2, the right or left position of said wheel.

The invention claimed is:

1. A method of locating the right or left position of a wheel (2) of a vehicle (3) equipped with an electronic monitoring system unit (1), characterized in that it consists:

in incorporating in the electronic unit (1) a magnetic measuring component (4) comprising a core (5) made of ferromagnetic material on which are arranged, crosswise, two windings (8, 9) configured to present maximum sensitivity axes (S8, S9) offset from each other by a predetermined angle θ, and in positioning said magnetic measuring component in said electronic unit so that the maximum sensitivity axes (S8, S9) of the windings (8, 9) extend in a plane intersecting the axis of rotation (R) of the wheel (2), and, when the vehicle moves in a given direction of movement:

in measuring a signal generated by the variation of a magnetic field at the terminals of each of the windings (8, 9), so as to deliver two periodic signals phase-shifted from each other by an angular value equal to (+ or −) θ, each representative of the variations of the values of the magnetic field detected by said windings during a wheel rotation (2), in determining from this phase shift the direction of rotation of the wheel (2), and in deducing, from this direction of rotation and from the direction of movement of the vehicle (3), the location of the right or left position of the wheel (2).

2. A device for locating the right or left position of a wheel (2) of a vehicle (3) equipped with an electronic monitoring system unit (1), characterized in that it comprises, incorporated in said electronic unit:

a magnetic measuring component (4) comprising a core (5) made of ferromagnetic material on which are arranged, crosswise, two windings (8, 9) formed so as to present maximum sensitivity axes (S8, S9) offset from each other by a predetermined angle θ, said magnetic measuring component being positioned in said electronic unit so that the maximum sensitivity axes (SB, S9) of the windings (8, 9) extend in a plane intersecting the axis of rotation (R) of the wheel (2), means (10, 11) of measuring a signal at the terminals of each of the windings (8, 9), able to deliver two periodic signals phase-shifted from each other by an angular value equal to (+ or −) θ, each representative of the variations of the values of the magnetic field detected by said windings during a wheel rotation (2), and a computation unit (12) programmed to determine, from the phase shift between the two periodic signals, the direction of rotation of the wheel (2), and to deduce, from this direction of rotation and from the direction of movement of the vehicle (3), the location of the right or left position of the wheel (2).

3. The locating device as claimed in claim 2, characterized in that the magnetic measuring component (4) is positioned in the magnetic unit (1) so that the maximum sensitivity axes (S8, S9) of the windings (8, 9) extend in a plane orthogonal to the axis of rotation (R) of the wheel (2).

4. The locating device as claimed in claim 3, characterized in that the magnetic measuring component (4) is provided with a core (5) having two pairs of parallel faces (5a, 5b) around each of which is wound a winding (8, 9), configured so that said pairs of parallel faces are orthogonal to each other.

5. The locating device as claimed in claim 4, characterized in that it comprises a magnet mounted in a fixed manner on the vehicle (3) relative to each wheel (2) equipped with a magnetic measuring component (4), said magnet being positioned and presenting a power suitable for generating a magnetic field covering a zone passed through by the windings (8, 9) when said wheel rotates.

6. The locating device as claimed in claim 3, characterized in that it comprises a magnet mounted in a fixed manner on the vehicle (3) relative to each wheel (2) equipped with a magnetic measuring component (4), said magnet being positioned and presenting a power suitable for generating a magnetic field covering a zone passed through by the windings (8, 9) when said wheel rotates.

7. The locating device as claimed in claim 2, characterized in that it comprises a magnet (10) mounted in a fixed manner on the vehicle (3) relative to each wheel (2) equipped with a magnetic measuring component (4), said magnet being positioned and presenting a power suitable for generating a magnetic field covering a zone passed through by the windings (8, 9) when said wheel rotates.

* * * * *